(12) United States Patent
Lee et al.

(10) Patent No.: US 9,040,192 B2
(45) Date of Patent: May 26, 2015

(54) LITHIUM RECHARGEABLE BATTERY

(75) Inventors: Seongjoon Lee, Yongin-si (KR);
Myungjun Lee, Yongin-si (KR); Kisung Hong, Yongin-si (KR)

(73) Assignee: Samsung SDI Co., Ltd. (KR)

( * ) Notice: Subject to any disclaimer, the term of this patent is extended or adjusted under 35 U.S.C. 154(b) by 1180 days.

(21) Appl. No.: 12/409,057

(22) Filed: Mar. 23, 2009

(65) Prior Publication Data

US 2009/0246620 A1 Oct. 1, 2009

(51) Int. Cl.

| H01M 2/02 | (2006.01) |
|---|---|
| H01M 4/13 | (2010.01) |
| H01M 2/04 | (2006.01) |
| H01M 2/34 | (2006.01) |
| H01M 2/22 | (2006.01) |
| H01M 10/04 | (2006.01) |
| H01M 10/48 | (2006.01) |
| H01M 10/052 | (2010.01) |

(52) U.S. Cl.
CPC ............... *H01M 2/34* (2013.01); *H01M 2/22* (2013.01); *H01M 10/0436* (2013.01); *H01M 10/052* (2013.01); *H01M 10/48* (2013.01)

(58) Field of Classification Search
CPC ..... H01M 2/34; H01M 2/22; H01M 10/0436; H01M 10/052; H01M 10/48
See application file for complete search history.

(56) References Cited

U.S. PATENT DOCUMENTS

| 7,935,439 B2 * | 5/2011 | Kim ............................... 429/161 |
|---|---|---|
| 2007/0026302 A1 * | 2/2007 | Yoon ............................. 429/129 |
| 2007/0264535 A1 * | 11/2007 | Lee et al. .......................... 429/7 |
| 2008/0096101 A1 * | 4/2008 | Kwag et al. ................... 429/121 |
| 2008/0241680 A1 * | 10/2008 | Lee et al. ...................... 429/185 |

FOREIGN PATENT DOCUMENTS

| JP | 10-241736 | 9/1998 |
|---|---|---|
| JP | 2001-57191 | 2/2001 |
| JP | 2005-166581 A | 6/2005 |
| JP | 2006-164558 | 6/2006 |
| KR | 10-0770106 | 10/2007 |
| KR | 10-0897181 | 5/2009 |

OTHER PUBLICATIONS

Chinese Office Action dated Oct. 9, 2010 issued by the SIPO in corresponding Chinese Application No. 200910127095.2.
Notice of Allowance dated Sep. 11, 2012 in corresponding Japanese Patent Application No. 2009-76716.

* cited by examiner

*Primary Examiner* — Barbara Gilliam
*Assistant Examiner* — Angela Martin
(74) *Attorney, Agent, or Firm* — Knobbe Martens Olson & Bear LLP

(57) ABSTRACT

A lithium rechargeable battery including: a bare cell including an electrode assembly disposed in a pouch, the electrode assembly including two electrodes, a separator, and first and second electrode tabs that extend from the electrodes, through a first side of the bare cell; a protecting circuit board electrically connected to the first and second electrode tabs; a first lead plate connected to the protecting circuit board and the first electrode tab, and a second lead plate connected to the protecting circuit board and the second electrode tab. The protecting circuit board is provided on a second side of the bare cell, which is adjacent to the first side. The first and second lead plates are bent to extend along the first and second sides of the pouch.

22 Claims, 4 Drawing Sheets

LITHIUM RECHARGEABLE BATTERY

CROSS-REFERENCE TO RELATED APPLICATION

This application claims the benefit of Korean Application No. 2008-28992, filed Mar. 28, 2008, in the Korean Intellectual Property Office, the disclosure of which is incorporated herein by reference.

BACKGROUND OF THE INVENTION

1. Field of the Invention

Aspects of the present invention relate to a lithium rechargeable battery, and more particularly, to a lithium rechargeable battery having a battery pack with an optimized structure.

2. Description of the Related Art

In general, lithium rechargeable batteries can be classified as a cylindrical battery, a polygonal battery, and a pouch-type battery, in accordance with the shape of a case in which an electrode assembly and an electrolyte are accommodated. In a pouch-type battery, the electrode assembly is accommodated in a pouch, to form a bare cell, and the electrode assembly is connected to a protecting circuit board, to form a battery pack.

In the above-described pouch-type battery, in the electrode assembly, electrode tabs drawn from two electrodes are electrically connected to the protecting circuit board, via a lead plate. The protecting circuit board faces a surface from which the electrode tabs extend from the bare cell.

When the specification of an electrical device varies, or when the size of the protecting circuit board changes, the protecting circuit board can be provided on a surface from which the electrode tabs are not drawn. In such a case, since the electrode tabs are further separated from the protecting circuit board, the length of the lead plate increases. Therefore, the longer lead plate increases internal resistance of the battery.

As described above, in a lithium rechargeable battery, the structure of the lead plate has a large influence on optimizing the structure of the battery pack.

SUMMARY OF THE INVENTION

An aspect of the present invention is to provide a lithium rechargeable battery having an improved electrical connection between a bare cell and a protecting circuit board.

Another aspect of the present invention is to provide a lithium rechargeable battery having a minimized internal resistance, due to the structure of an electrical connection between a bare cell and a protecting circuit board.

According aspects of the present invention, there is provided a lithium rechargeable battery comprising: a bare cell comprising an electrode assembly including two electrodes and a separator, and a pouch in which the electrode assembly is accommodated; a protecting circuit board electrically connected to a first electrode tab and a second electrode tab, which extend from the two electrodes of the electrode assembly; and first and second lead plates to connect the protecting circuit board to the first and second electrode tabs. The protecting circuit board is provided on a surface adjacent to a surface from which the first and second electrode tabs project from the bare cell. The first and second lead plates are bent from the protecting circuit board, toward the surface from which the first and second electrode tabs project.

According aspects of the present invention, the first lead plate and the second lead plate are perpendicular to a direction in which the first electrode tab and the second electrode tab extend.

According aspects of the present invention, the first lead plate and the second lead plate intersect the first electrode tab and the second electrode tab.

According to an aspect of the present invention, the first lead plate and the second lead plate can be in the same plane.

According aspects of the present invention, the first lead plate and the second lead plate are separated from each other. Insulating members are provided on surfaces of the first lead plate and the second lead plate. The insulating members can be insulating tapes. The insulating tapes can be formed of polyimide.

According to aspects of the present invention, the first lead plate and the second lead plate can be disposed in parallel planes.

According aspects of the present invention, the first lead plate and the second lead plate can have the same width as a side surface of the bare cell. Insulating members are provided on the surfaces of the first lead plate and the second lead plate. The insulating members are insulating tapes. The insulating tapes are formed of polyimide.

According aspects of the present invention, an attachment sheet can be interposed between the first lead plate and the second lead plate, to attach the first lead plate to the second lead plate.

The first lead plate and the second lead plate can comprise connection tabs that are connected to the first electrode tab and the second electrode tab. The connection tabs extend perpendicularly from sides of each of the first lead plate and the second lead plate. The connection tabs are extend from sides of the first lead plate and the second plate, in the same direction as a direction in which the first electrode tab and the second electrode tab extend.

According aspects of the present invention, the connection tabs have the same area as the electrode tabs. The connection tabs comprise wings that extend in a widthwise direction, so that the area of the connection tabs can be larger than the electrode tabs.

According aspects of the present invention, the lead plates are provided on the different surfaces of the bare cell, and are bent to be in the same plane, so that the structure of the battery pack is optimized.

According aspects of the present invention, the lead plates extend in parallel planes, so that the internal resistance of the battery is minimized.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated, from the following description of the exemplary embodiments, taken in conjunction with the accompanying drawings, of which.

DETAILED DESCRIPTION OF THE EMBODIMENTS

Figure 1:
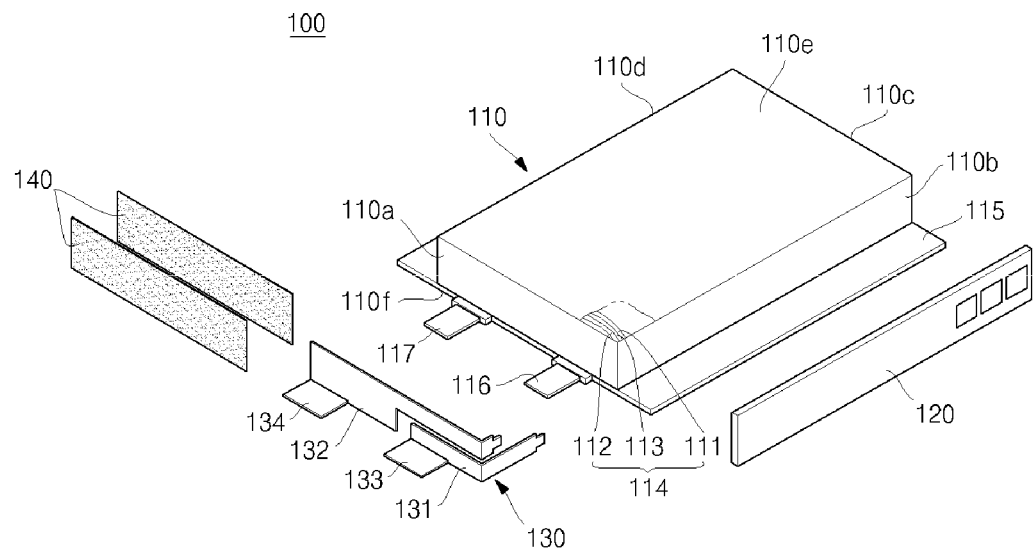
FIG. 1 is an exploded perspective view of a lithium rechargeable battery, according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2A:
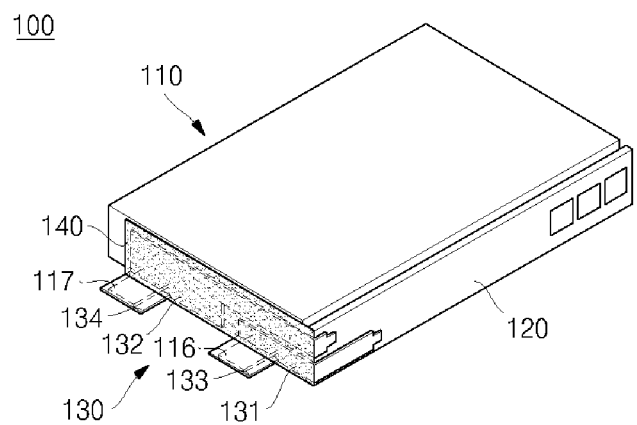
FIGS. 2A and 2B illustrate the lithium rechargeable battery of FIG. 1, as assembled.
Figure 2B:
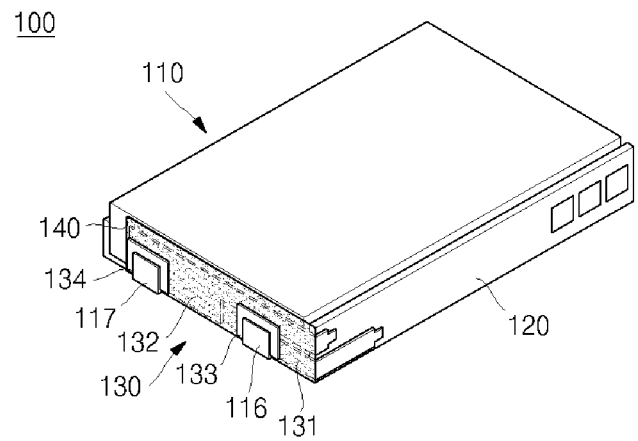

FIG. 1 is an exploded perspective view of a lithium rechargeable battery 100, according to an exemplary embodiment of the present invention. FIGS. 2A and 2B illustrate the lithium rechargeable battery 100, as assembled.

Referring to FIGS. 1, 2A, and 2B the lithium rechargeable battery 100 includes a bare cell 110, a protecting circuit board 120 connected to the bare cell 110, and a lead plate 130 to connect the bare cell 110 to the protecting circuit board 120. The protecting circuit board 120 is provided on a second surface of the bare cell 110, which is adjacent to a first surface from which the electrode tabs 116 and 117 extend. The protecting circuit board 120 protects the battery 100 from over charges and over discharges. The lead plate 130 is bent and extends from the first side to the second side.

The bare cell 110 includes an electrode assembly 114, including a positive electrode plate 111, a negative electrode plate 112, and a separator 113 interposed therebetween. The bare cell 110 includes a pouch-type case 115 (hereinafter, referred to as a pouch) that accommodates an electrolyte and the electrode assembly 114. The bare cell 110 is a rectangular prism. The bare cell 110 includes a first short side 110a, a second short side 110c that faces the first short side 110a, a first long side 110b, a second long side 110d that faces the first long side 110b, a first main side 110e, and a second main side 110f that faces the first main side 110e.

The first electrode tab 116 is attached to the positive electrode plate 111, and the second electrode tab 117 is attached to the negative electrode plate 112. The first electrode tab 116 and the second electrode tab 117 extend out of the bare cell 110, through the first short side 110a.

The protecting circuit board 120 is provided on the first long side 110b. However, the present invention is not limited to the above. The protecting circuit board 120 can be provided on the second long side 110d, for example.

The lead plate 130 includes a first lead plate 131 and a second lead plate 132. One end of the first lead plate 131 is connected to the protecting circuit board 120, and the other end of the first lead plate 131 is connected to the first electrode tab 116. The first lead plate 131 is bent at the edge between the first short side 110a and the first long side 110b. The first lead plate 131 extends along the first short side 110a. The first lead plate 131 extends to the first electrode tab 116.

One end of the second lead plate 132 is connected to the protecting circuit board 120, and the other end of the second lead plate 132 is connected to the second electrode tab 117. The second lead plate 132 is bent at the edge between the first short side 110a and the first long side 110b. The second lead plate 132 extends along the first short side 110a. The second lead plate 132 extends to the second electrode tab 117.

The first lead plate 131 and the second lead plate 132 extend in parallel across the first short side 110a. The first lead plate 131 and the second lead plate 132 are connected to the protecting circuit board 120. Since the first lead plate 131 is connected to the first electrode tab 116 and the second lead plate 132 is connected to the second electrode tab 117, the first lead plate 131, and the second lead plate 132 are separated from each other.

Insulating tapes 140 are attached to opposing surfaces of the first lead plate 131 and the second lead plate 132. The insulating tapes 140 are generally formed of polyimide. However, the material of the insulating tapes 140 is not limited to polyimide.

The first lead plate 131 includes a first connection tab 133, and the second lead plate 132 includes a second connection tab 134. The first connection tab 133 extends from one side of the first lead plate 131, at a position corresponding to the first electrode tab 116. The second connection tab 134 extends from one side of the second lead plate 132, at a position corresponding to the second electrode tab 117.

The first connection tab 133 and the second connection tab 134 are bent perpendicularly from the sides of the first lead plate 131 and the second lead plate 132. The first connection tab 133 and the second connection tab 134 extend in parallel, away from the first short side 110a.

The first connection tab 133 and the second connection tab 134 can have the same width as the first electrode tab 116 and the second electrode tab 117. The width of the first connection tab 133 and the second connection tab 134 can be larger than the width of the first electrode tab 116 and the second electrode tab 117. Therefore, assembly dispersion can be reduced, due to the positions of the first electrode tab 116 and the second electrode tab 117.

Referring to FIG. 2A, ends of the first lead plate 131 and the second lead plate 132 are welded to the protecting circuit board 120, so that the first lead plate 131 and the second lead plate 132 are electrically connected to the protecting circuit board 120. The first lead plate 131 and the second lead plate 132 are bent at the edge between the first long side 110b and the first short side 110a, so as to extend to the first electrode tab 116 and the second electrode tab 117.

The first connection tab 133 and the second connection tab 134 extend in parallel with the first electrode tab 116 and the second electrode tab 117. The first electrode tab 116 and the first connection tab 133 are electrically connected to each other, by welding, for example. The second electrode tab 117 and the second connection tab 134 are electrically connected to each other, by welding, for example.

As illustrated in FIG. 2B, when the battery 100 is assembled, the first electrode tab 116 and the first connection tab 133 are folded toward the first lead plate 131. The second electrode tab 117 and the second connection tab 134 are folded toward the second lead plate 132. In this way, the bare cell 110 and the protecting circuit board 120 are connected to each other.

Figure 3:
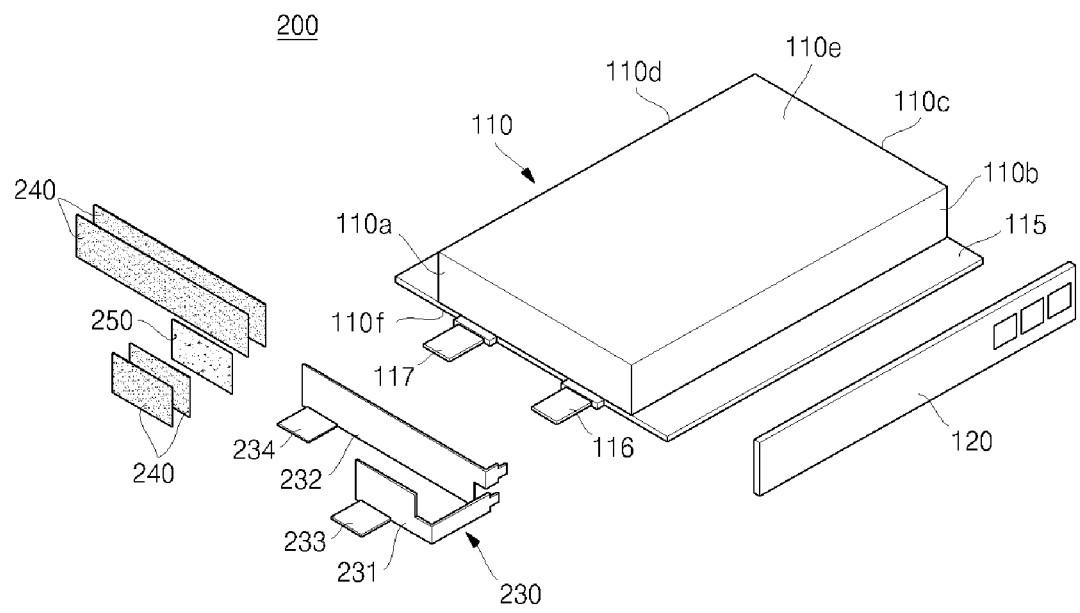
FIG. 3 is an exploded perspective view of a lithium rechargeable battery, according to another exemplary embodiment of the present invention.
Figure 4A:
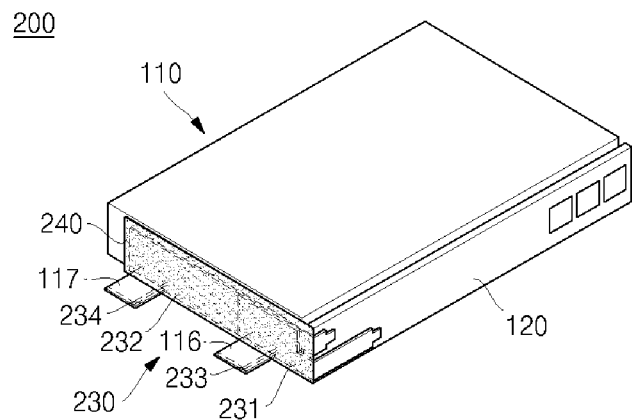
FIGS. 4A and 4B illustrate the lithium rechargeable battery of FIG. 3, as assembled.
Figure 4B:
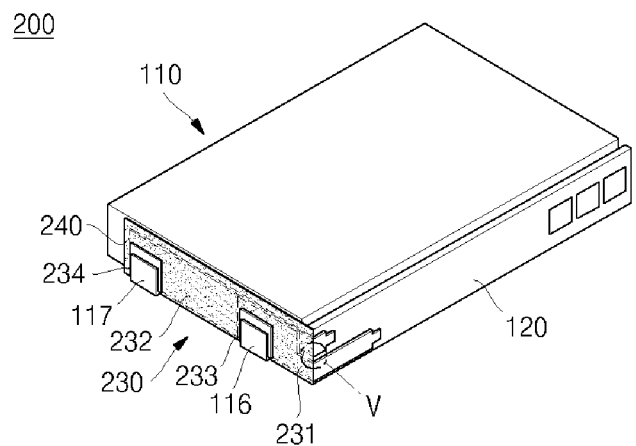
Figure 5:
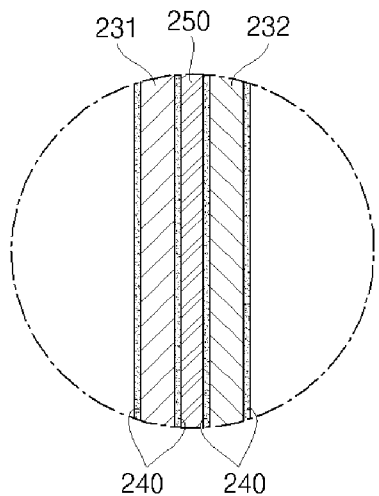
FIG. 5 illustrates the enlargement of part V of FIG. 4B.

FIG. 3 is an exploded perspective view of a lithium rechargeable battery 200, according to another exemplary embodiment of the present invention. FIGS. 4A and 4B illustrate the lithium rechargeable battery 200, as assembled. FIG. 5 illustrates an enlargement of part V of FIG. 4B.

Referring to FIGS. 3 to 5, the lithium rechargeable battery 200 includes a bare cell 110, a protecting circuit board 120 connected to the bare cell 110, and a lead plate 230 connected to the bare cell 110 and the protecting circuit board 120. In the lithium rechargeable battery 200, the structure of the lead plate 230 is different from the structure of the lead plate 130 in the lithium rechargeable battery 100. Therefore, the lead plate 230 will mainly be described, and a description of similar elements is omitted.

In the lithium rechargeable battery 200, the lead plate 230 includes a first lead plate 231 and a second lead plate 232. The first lead plate 231 and the second lead plate 232 respectively extend from the first electrode tab 116 and the second electrode tab 117, and overlap one another along the first short side 110a of the bare cell 110. The first lead plate 231 and the second lead plate 232 are connected to the protecting circuit board 120. The first lead plate 231 and the second lead plate 232 are separated from each other.

Since the first lead plate 231 and the second lead plate 232 overlap, the widths of the first lead plate 231 and the second lead plate 232 can be as large as the width of the first short side 110a. Since the areas of the first lead plate 231 and the second lead plate 232 can be increased, due to the overlap, current flow can be increased, and the internal resistance of the battery 200 is reduced.

Insulating tapes 240 are attached to opposing surfaces of the first lead plate 231 and the second lead plate 232, to insulate the first and second lead plates 231 and 231. The insulating tapes 240 can be formed of polyimide. However, the material of the insulating tapes 240 is not limited to polyimide.

An attachment sheet 250 can be interposed between the first lead plate 231 and the second lead plate 232, to attach the first lead plate 231 to the second lead plate 232. The first lead plate 231 includes a first connection tab 233 that is connected to the first electrode tab 116. The second lead plate 232 includes a second connection tab 234 that is connected to the second electrode tab 117.

The first connection tab 233 extends from one side of the first lead plate 131, adjacent to the first electrode tab 116. The second connection tab 234 extends from one side of the second lead plate 232, adjacent to the second electrode tab 117.

The first connection tab 233 and the second connection tab 234 are bent perpendicularly from the sides of the first lead plate 231 and the second lead plate 232. The first connection tab 233 and the second connection tab 234 extend in parallel, away from the first short side 110a. The first connection tab 233 and the second connection tab 234 have the same widths as the first electrode tab 116 and the second electrode tab 117.

Referring to FIG. 4A, ends of the first lead plate 231 and the second lead plate 232 are welded to the protecting circuit board 120, so that the first lead plate 231 and the second lead plate 232 are electrically connected to the protecting circuit board 120. The first lead plate 231 and the second lead plate 232 are bent at the edge between the first long side 110b and the first short side 110a, so as to extend across the first short side 110a.

The first connection tab 233 and the second connection tab 234 extend in parallel with the first electrode tab 116 and the second electrode tab 117. The first electrode tab 116 and the first connection tab 233 are electrically connected to each other, by welding, for example. The second electrode tab 117 and the second connection tab 234 are electrically connected to each other, by welding, for example.

As illustrated in FIG. 4B, when the battery 200 is assembled, the first electrode tab 116 and the first connection tab 233 are folded toward the first lead plate 231, and the second electrode tab 117 and the second connection tab 234 are folded toward the second lead plate 232. In this way, the bare cell 110 and the protecting circuit board 120 are connected to each other.

Figure 6:
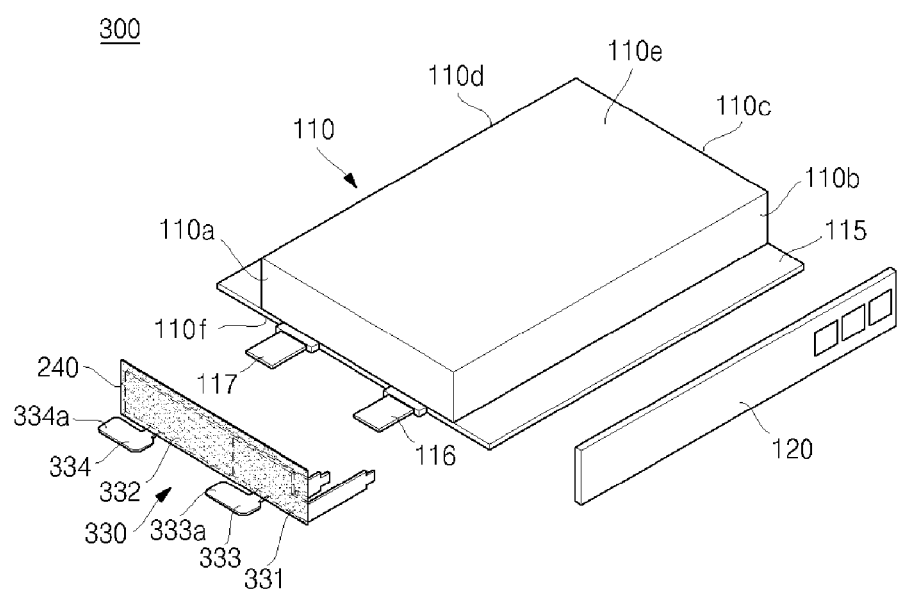
FIG. 6 is an exploded perspective view of a lithium rechargeable battery, according to another exemplary embodiment of the present invention.

FIG. 6 is an exploded perspective view of a lithium rechargeable battery 300, according to a still another exemplary embodiment of the present invention. Referring to FIG. 6, the lithium rechargeable battery 300 includes a bare cell 110, a protecting circuit board 120 connected to the bare cell 110, and a lead plate 330 connected to the bare cell 110 and the protecting circuit board 120.

In the lithium rechargeable battery 300, the a first connection tab 333 and a second connection tab 334 of the lead plate 330 are different from the first connection tab 233 and the second connection tab 234 of the lithium rechargeable battery 200. Therefore, the lithium rechargeable battery 300 will be described with respect to the first connection tab 333 and the second connection tab 334 of the lead plate 330, and a description of similar elements is omitted.

The battery 300 includes a wing 333a that extends from the first connection tab 333, and a wing 334a that extends from the second connection tab 334. The area of the first connection tab 333 and the second connection tab 334 is increased by the wings 333a and 334a. Therefore, the first and second connection tabs 333 and 334 do not need to extend to the first and second electrode tabs 116, 117.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:
1. A lithium rechargeable battery comprising:
   a bare cell comprising,
      an electrode assembly comprising first and second electrodes and a separator disposed therebetween,
      a pouch in which the electrode assembly is housed, and
      first and second electrode tabs extending from the first and second electrodes, through a first side of the bare cell, and further extending away from the bare cell;
   a protecting circuit board electrically connected to the first and second electrode tabs, disposed on a second side of the bare cell;
   a first lead plate connected to the protecting circuit board and the first electrode tab, wherein the first lead plate comprises a first connection tab extending from one side of the first lead plate and away from the bare cell, the first connection tab being electrically coupled with the first electrode tab; and
   a second lead plate connected to the protecting circuit board and the second electrode tab, wherein the second lead plate comprises a second connection tab extending from one side of the second lead plate and away from the bare cell, the first connection tab being electrically coupled with the second electrode tab,
   wherein the first lead plate and the second lead plate are bent at a common intersection of the first and second sides of the bare cell, so as to extend along the first and second sides of the bare cell.

2. The lithium rechargeable battery as claimed in claim 1, wherein: the first lead plate extends to the first electrode tab; and the second lead plate extends to the second electrode tab.

3. The lithium rechargeable battery as claimed in claim 1, wherein the first and second electrode tabs are bent to respectively face the first and second lead plates.

4. The lithium rechargeable battery as claimed in claim 1, wherein the first and second lead plates extend in the same plane, across the first side of the bare cell.

5. The lithium rechargeable battery as claimed in claim 4, wherein the first and second lead plates are separated from each other.

6. The lithium rechargeable battery as claimed in claim 4, further comprising insulating members to insulate the first lead plate and the second lead plate.

7. The lithium rechargeable battery as claimed in claim 6, wherein the insulating members are insulating tapes.

8. The lithium rechargeable battery as claimed in claim 7, wherein the insulating tapes comprise polyimide.

9. The lithium rechargeable battery as claimed in claim 1, wherein the first lead plate and the second lead plate overlap each other along the first side of the bare cell.

10. The lithium rechargeable battery as claimed in claim 9, wherein the first lead plate and the second lead plate have the same width as the first side of the bare cell.

11. The lithium rechargeable battery as claimed in claim 9, further comprising insulating members to insulate the first lead plate and the second lead plate.

12. The lithium rechargeable battery as claimed in claim 11, wherein the insulating members are insulating tapes.

13. The lithium rechargeable battery as claimed in claim 12, wherein the insulating tapes comprise polyimide.

14. The lithium rechargeable battery as claimed in claim 9, further comprising an attachment sheet to attach the first lead plate to the second lead plate.

15. The lithium rechargeable battery as claimed in claim 1, wherein:
   the first lead plate comprises a first connection tab that is connected to the first electrode tab; and
   the second lead plate comprises a second connection tab that is connected to the second electrode tab.

16. The lithium rechargeable battery as claimed in claim 15, wherein the first and second connection tabs respectively extend from edges of the first and second electrode tabs and are perpendicular to the first side of the bare cell.

17. The lithium rechargeable battery as claimed in claim 15, wherein the first and second connection tabs extend from sides of the first and second lead plates, which face the first and second electrode tabs respectively.

18. The lithium rechargeable battery as claimed in claim 15, wherein the first and second connection tabs have the same area as the first and second electrode tabs.

19. The lithium rechargeable battery as claimed in claim 15, wherein the first and second connection tabs comprise wings that extend therefrom, along the first side of the bare cell.

20. The lithium rechargeable battery as claimed in claim 15, wherein the first and second connection tabs and the first and second electrode tabs are bent to face the first side of the bare cell.

21. The lithium rechargeable battery as claimed in claim 1, wherein:
   the bare cell is a rectangular prism comprising the first side, an opposing third side, the second side, an opposing fourth side, and first and second main sides that are connected to opposing edges of the first, second, third, and fourth sides.

22. The lithium rechargeable battery as claimed in claim 21, wherein the first and third sides are shorter than the second and fourth sides.

* * * * *